United States Patent
Xu

(10) Patent No.: US 7,123,473 B2
(45) Date of Patent: Oct. 17, 2006

(54) COMPUTER BEZEL

(75) Inventor: Ji-Guo Xu, Shenzhen (CN)

(73) Assignee: Hon Hai Precision Industry Co., Ltd., Taipei Hsien (TW)

( * ) Notice: Subject to any disclaimer, the term of this patent is extended or adjusted under 35 U.S.C. 154(b) by 35 days.

(21) Appl. No.: 11/018,228

(22) Filed: Dec. 20, 2004

(65) Prior Publication Data

US 2005/0231901 A1    Oct. 20, 2005

(30) Foreign Application Priority Data

Apr. 15, 2004   (CN) .................. 2004 2 0044960

(51) Int. Cl.
*G06F 1/16* (2006.01)
*H05K 5/00* (2006.01)
*H05K 7/00* (2006.01)

(52) U.S. Cl. .................. 361/683; 200/296; 200/343; 200/1 R; 200/5 R

(58) Field of Classification Search ................. 361/683
See application file for complete search history.

(56) References Cited

U.S. PATENT DOCUMENTS

| 4,733,035 | A | * | 3/1988 | Ohashi ........................ 200/568 |
| 5,998,750 | A | * | 12/1999 | Wegener et al. ............ 200/564 |
| 6,160,232 | A | * | 12/2000 | Lin ............................. 200/341 |
| 6,667,447 | B1 | * | 12/2003 | Liu et al. .................... 200/5 R |

* cited by examiner

*Primary Examiner*—Elvin Enad
*Assistant Examiner*—Lheiren Mae A. Anglo
(74) *Attorney, Agent, or Firm*—Tim Tingkang Xia; Morris Manning Martin LLP

(57) ABSTRACT

A computer bezel includes a front panel, a power button attached to the front panel; an annular member attached to the front panel and set around the power button; and a protective member for covering the power button. The front panel includes a concave portion defining two slots and two through holes therein, the protective member includes two hooks engaging in the slots for slidably attaching the protective member to the front panel. Two posts formed on the protective member. When each post is in alignment with the corresponding through hole, the protective member is depressed to push the power button.

12 Claims, 7 Drawing Sheets

COMPUTER BEZEL

BACKGROUND OF THE INVENTION

1. Field of the Invention

The present invention relates to computer bezels, and particularly to a computer bezel having a protective member for protecting power button of the computer bezel from undesired pressing.

2. Description of the Related Art

Many electronic products have bezels attached to their front faces. Any typical product among a variety of electronic products has a variety of controlling buttons attached to its bezel. Each button is for switching on the appropriate controlling circuit of the electronic products when the button is pushed. An example of this means is disclosed in U.S. Pat. No. 6,477,447. However the power button of the computer were exposed to the user. It became apparent that the computer did not provide the required protective to prevent the undesired turning on/off the system. If the computer is undesired shut down, computer systems may experience data damage, data loss, file corruption or hardware damage.

Thus, an improved computer bezel which overcomes the above-mentioned problems is desired.

SUMMARY OF THE INVENTION

Accordingly, an object of the present invention is to provide a computer bezel which has a protective member for protecting power button of the computer bezel from undesired pressing.

To achieve the above object, a computer bezel of the present invention includes a front panel, a power button attached to the front panel; an annular member attached to the front panel and set around the power button; and a protective member for covering the power button. The front panel includes a concave portion defining two slots and two through holes therein, the protective member includes two hooks engaging in the slots for slidably attaching the protective member to the front panel. Two posts formed on the protective member. When each post is in alignment with the corresponding through hole, the protective member is depressed to push the power button. [0007] Other objects, advantages and novel features of the present invention will become more apparent from the following detailed description when taken in conjunction with the accompanying drawings, in which:

DETAILED DESCRIPTION OF THE INVENTION

Figure 1:
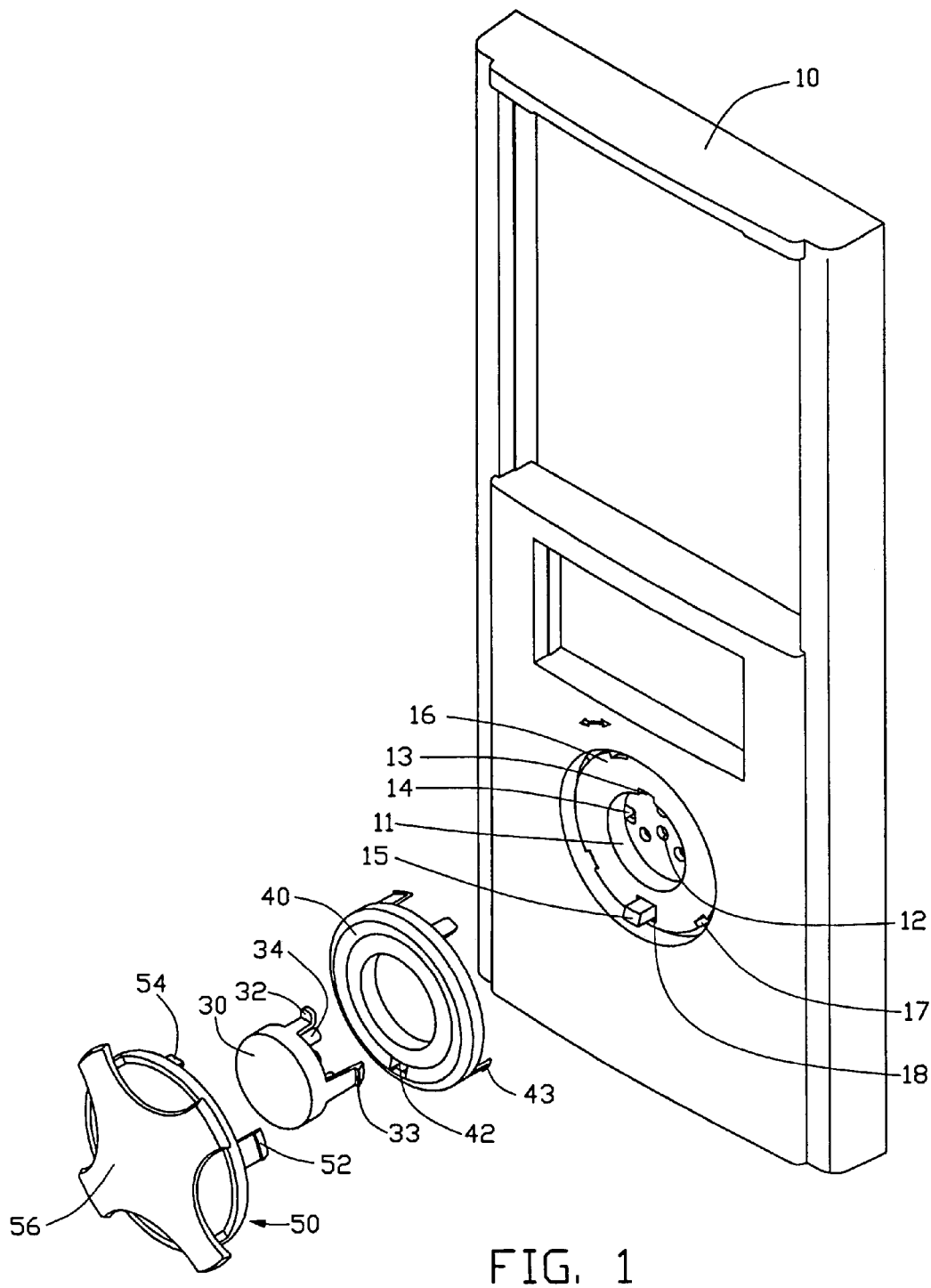
FIG. 1 is an exploded, isometric view of a computer bezel in accordance with the present invention.
Figure 2:
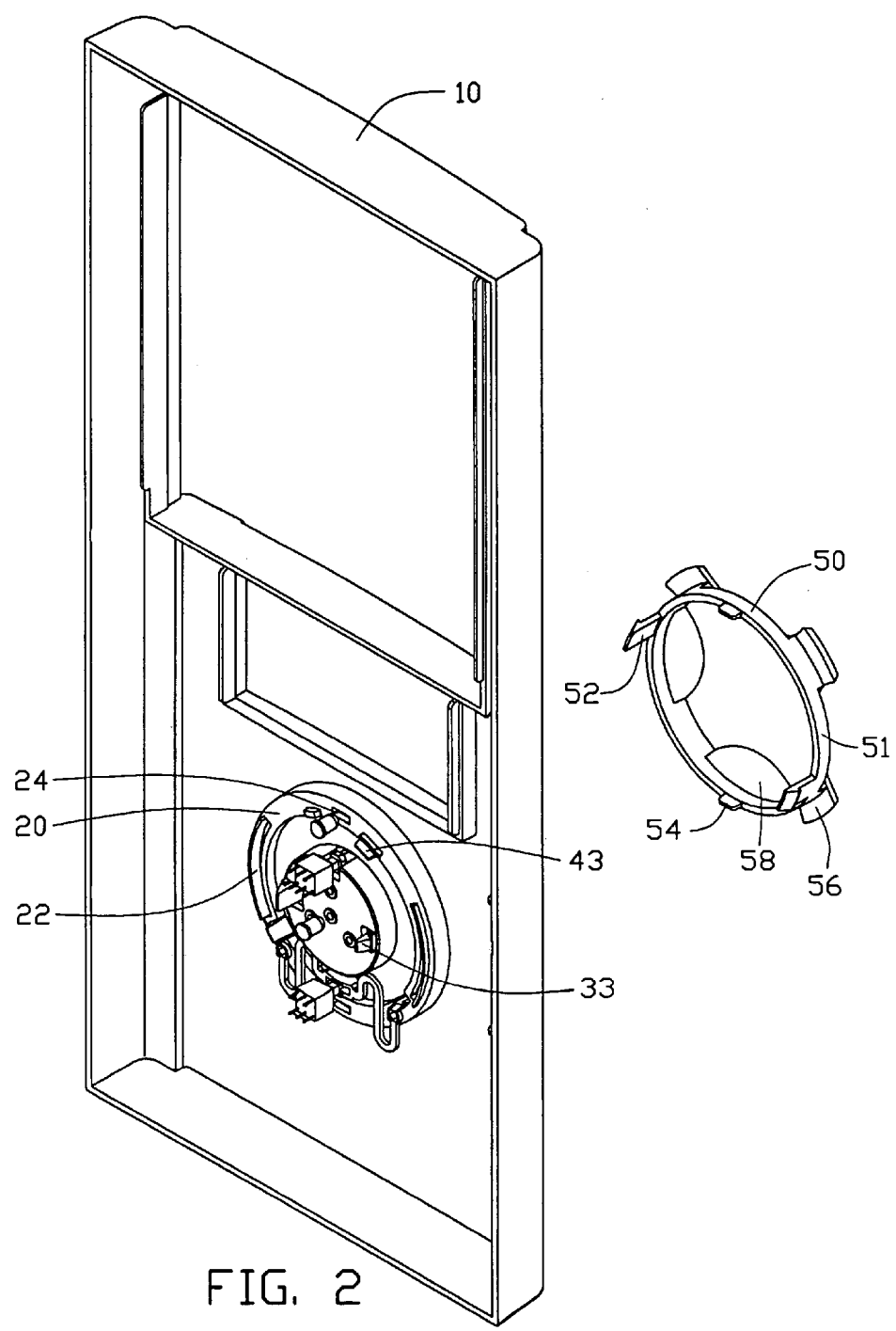
FIG. 2 is an isometric view of a computer bezel with the power button and the annular member attached to the front panel.
Figure 3:
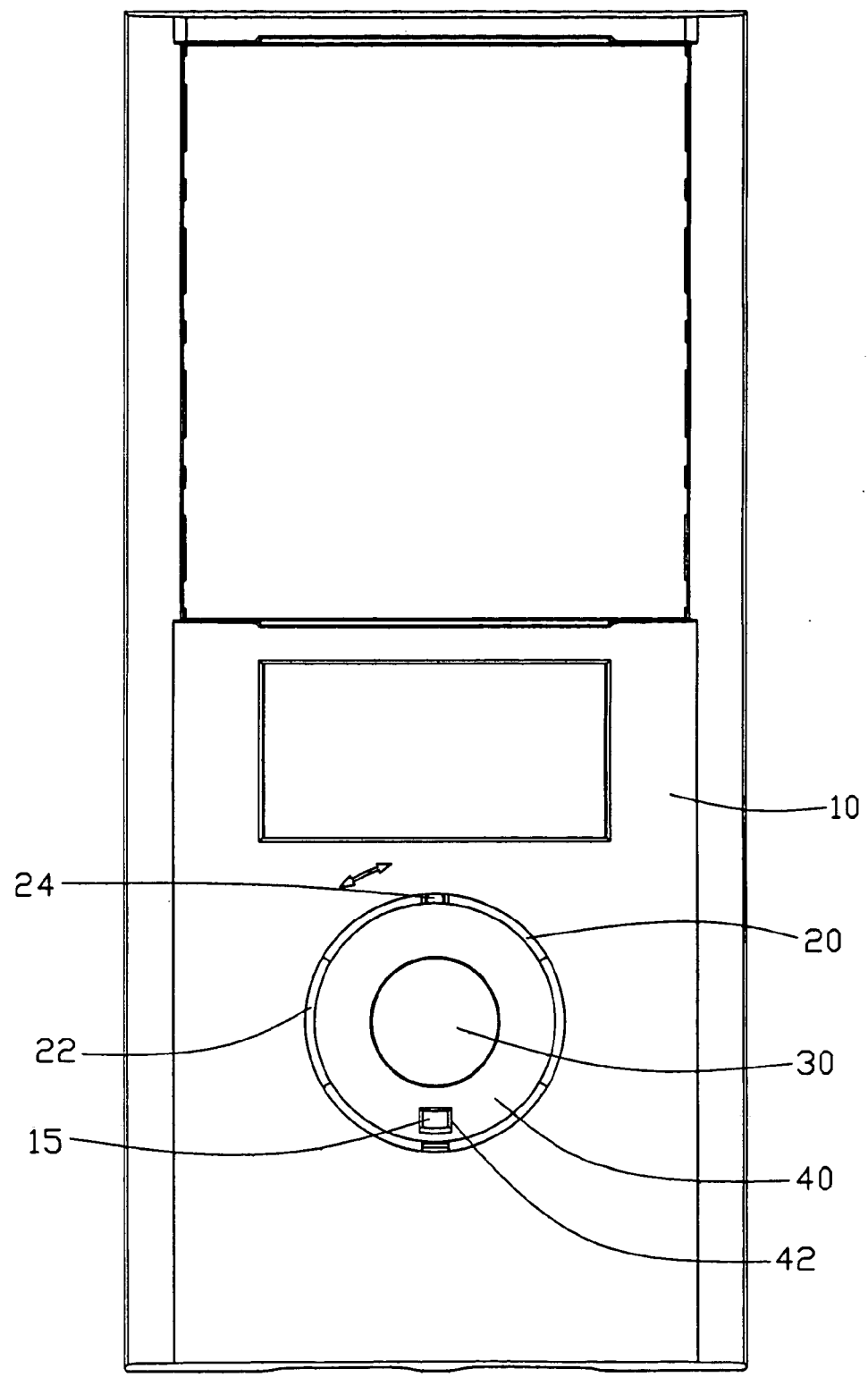
FIG. 3 is a front elevational view of the front panel with the power button and the annular member attached thereon.
Figure 4:
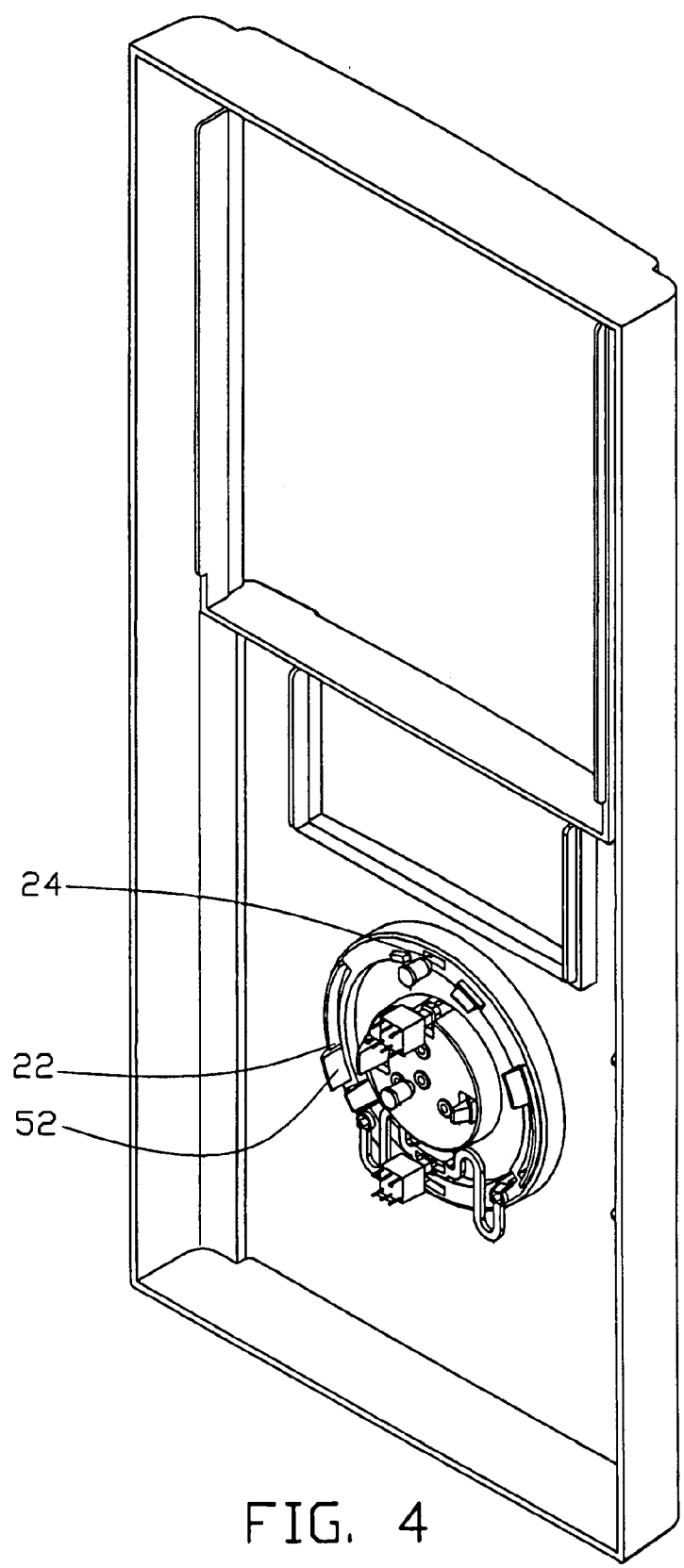
FIG. 4 is an isometric view of the computer bezel of FIG. 1 fully assembled, but showing the protective member at a non-operation position.
Figure 5:
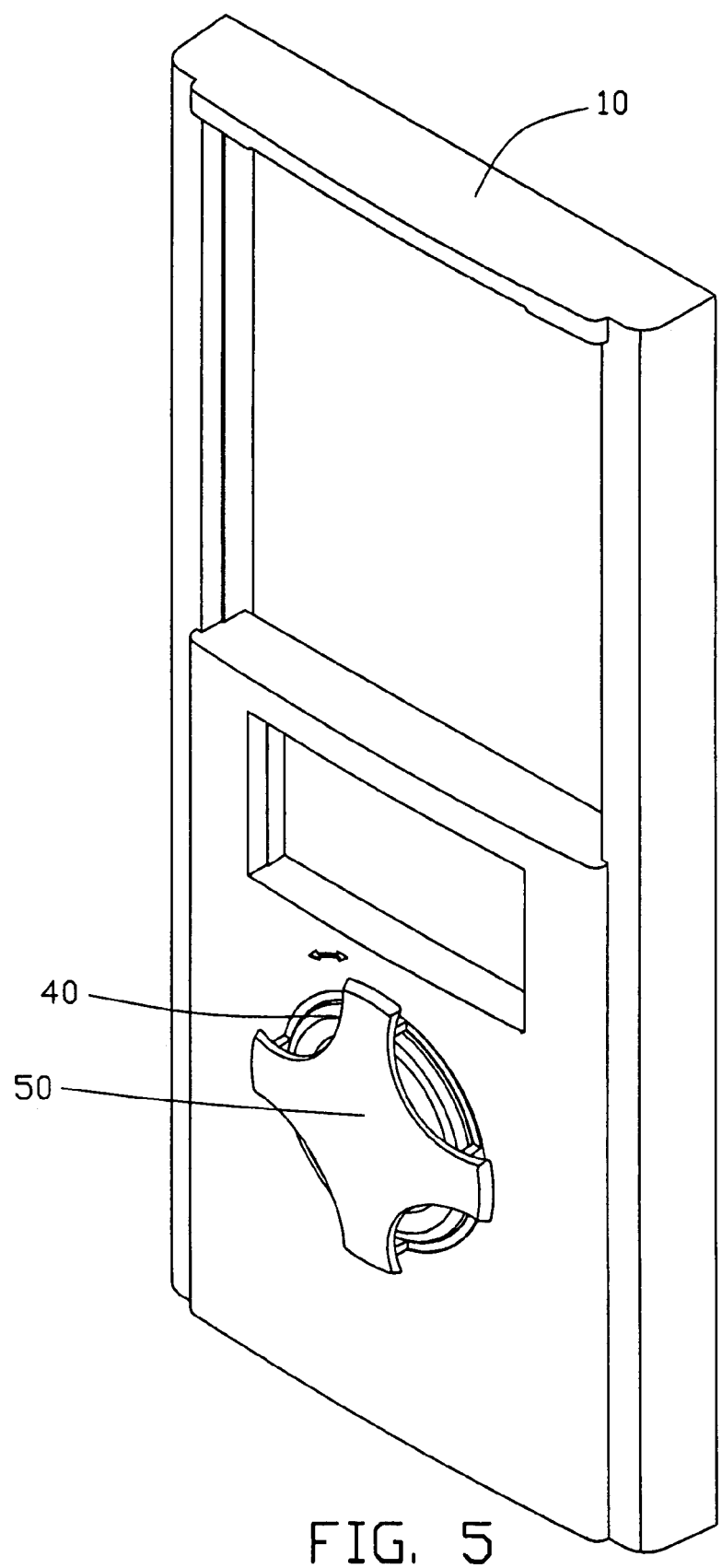
FIG. 5 is similar to FIG. 4, but view from another direction.
Figure 6:
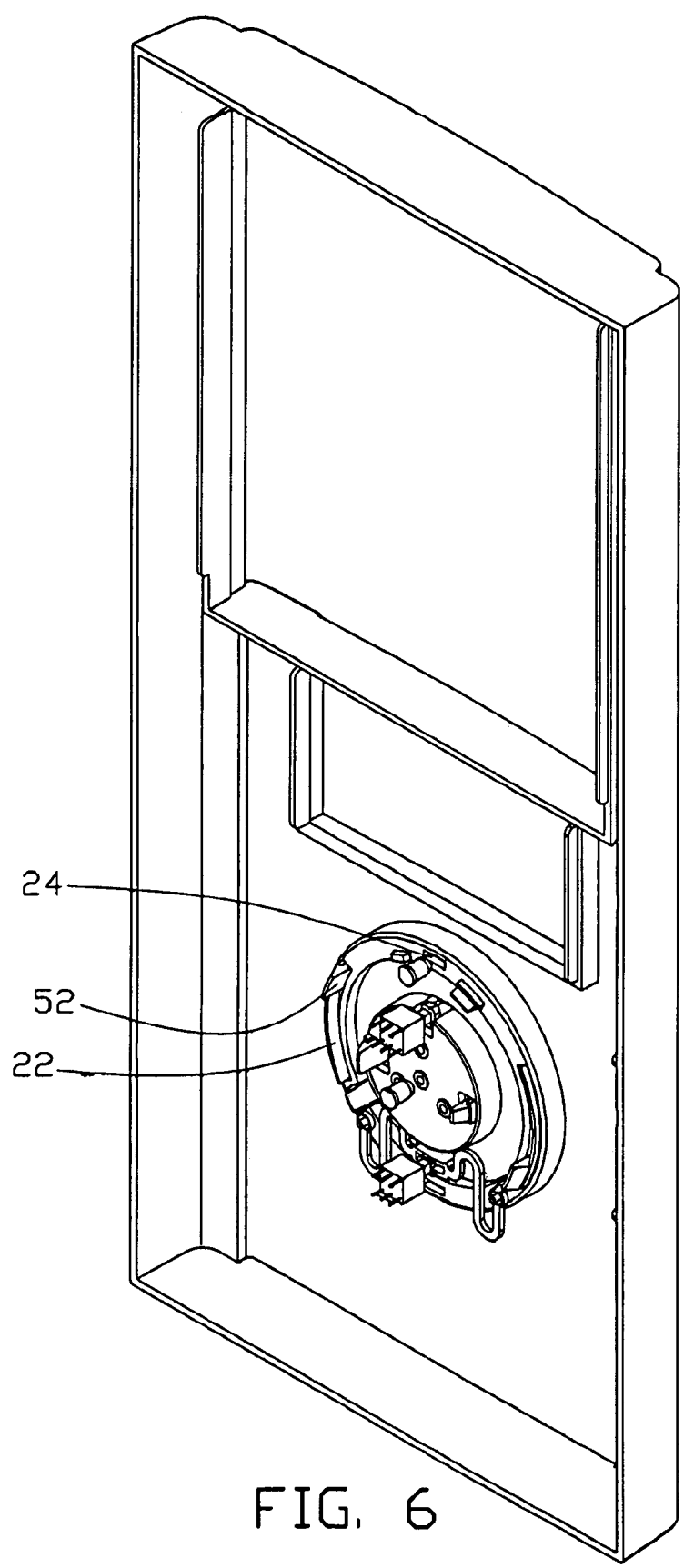
FIG. 6 is similar to FIG. 4 showing the protective member at an operation position.
Figure 7:
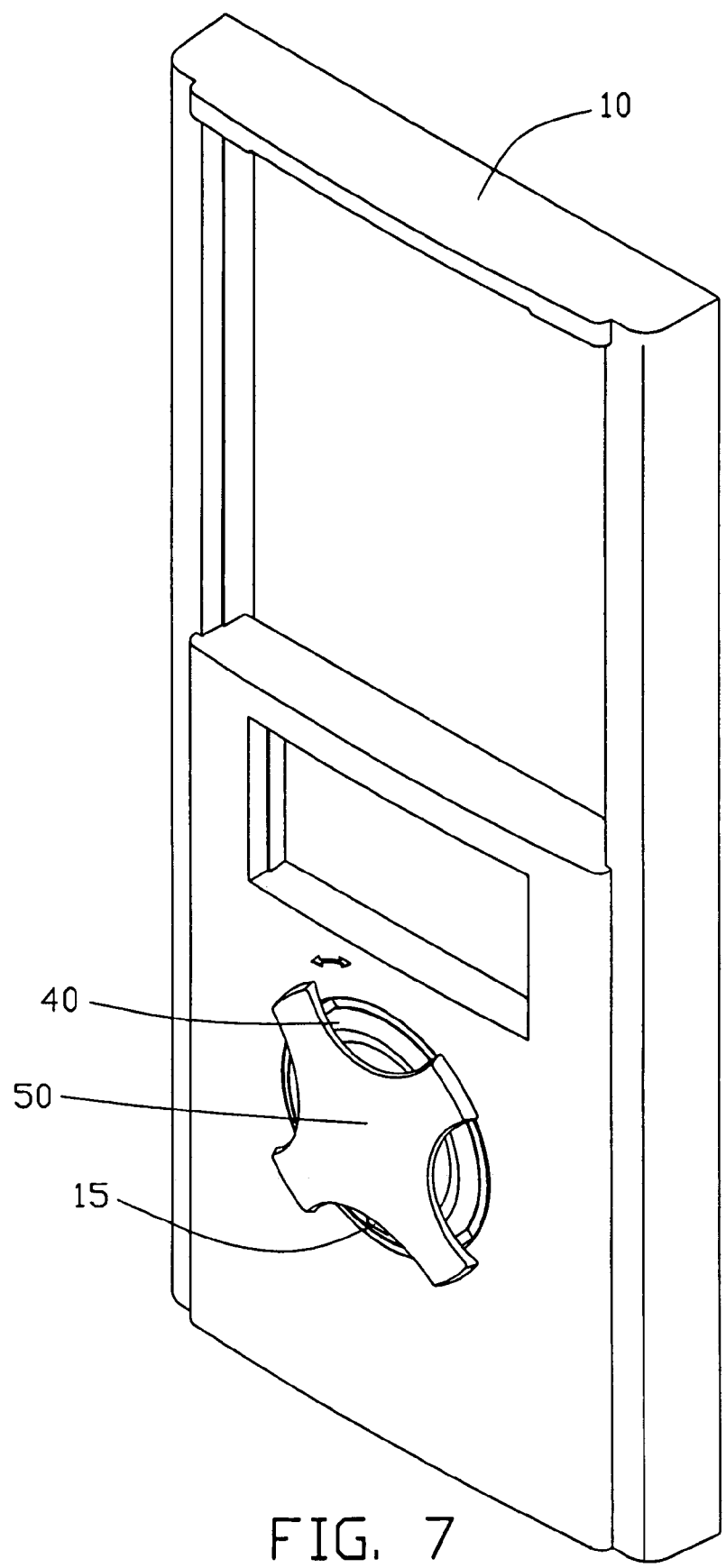
FIG. 7 is similar to FIG. 6, but view from another direction.

Referring to FIGS. 1 to 3, a bezel of an electronic device like a computer in accordance with a preferred embodiment of the present invention comprises a front panel 10 as a front, user-accessible side of the bezel, a power button 30, an annular member 40, and a protective member 50.

The front panel 10 defines a receiving portion 11 therein for accommodating the power button 30. A first locking hole 13 and a plurality of guiding holes 12 are defined in a rearmost part of the receiving portion 11. Two openings 14 are symmetrically defined in the receiving portion 11. An annular portion 16 is formed around the receiving portion 11. A plurality of second locking holes 17 is defined therein. A square hole 18 is defined in a lower part of the annular portion 16. A concave portion 20 is defined around the annular portion 16 and defines two symmetrical arcuate guiding slots 22 and two through holes 24 therein.

The power button 30 comprises a contacting block 32, two first hooks 33, and a plurality of guiding posts 34. The contacting block 32 extends rearwardly from a periphery of a back wall of the power button 30 for penetrating the first locking hole 13 and switching a computer on or off. The first hooks 33 are locked in the openings 14 for attaching the power button 30 to the panel 10. The guiding posts 34 extend rearwardly from a middle of the back wall of the power button 30 for being received in the guiding holes 12. A reset button 15 is mounted on the front panel 10 and extends from the square aperture 18 of the front panel 10 to reset the system to a default value.

The annular member 40 has a plurality of second hooks 43 engaging in corresponding second locking holes 17 for attaching the annular member 40 to the front panel 10. An orifice 42 is defined in the annular member 40 for the reset button 15 extending therethrough.

The protective member 50 is movably attached on the front panel 10 and capable of covering the power button 30. The protective member 50 comprises a circular flange 51 and an operation portion 56. Two third hooks 52 extend rearwardly from the circular flange 51 and are slidingly engageable with the guiding slots 22 of the front panel 10. Two posts 54 extend rearwardly from the circular flange 51 for sliding in the concave portion 20 and is capable of being received in the through holes 24. Each post 54 is slid into the through hole 24 when the third hooks 52 slide to an end of each slot 22. The operation portion 56 is generally cross-shaped. Four cutouts 58 are formed between edges of the operation portion 56 and the circular flange 51 so that the reset button 15 is capable of being exposed from one of the cutouts 58.

Referring to FIGS. 4 to 7, in assembly, the first hooks 33 are engagingly extended into the corresponding first locking holes 13 of the receiving portion 11. The contacting block 32 and the guiding poles 34 extend into the corresponding first locking hole 13 and the guiding holes 12 respectively. The power button 30 is thereby attached to the front panel 10. Then the second hooks 43 engage in the corresponding second locking holes 17 to attaching the annular member 40 to the front panel 10 with the reset button 15 penetrating from the orifice 42. The protective member 50 is mounted on the panel 10 with the third hooks 52 engaging in the slots 22.

Referring also to FIGS. 4 to 7, in use, the protective member 50 selectively moves between an operating position and a non-operating position. When the protective member 50 is in the non-operation position, the posts 54 of the protective member 50 is held by the concave portion 20 of the front panel 10, the protective member 50 abuts the power button 30, and further, the reset button 15 is covered by the protective member 50. With this state, there is no danger of an undesired pressing of the power button 30 and the reset button 15 even though the protective member 50 is pressed. Therefore, the power button 30 and the reset button 15 can be surely prevented from being depressed by mistake.

When the operation portion 56 of the protective member 50 is rotated in the counterclockwise direction, the third hooks 52 are moved along the guiding slots 22 of the panel 10. When the third hooks 52 are slid to an end of the slots 22, the protective member 50 is in the operating position, and the posts 54 are in alignment with the through holes 24. Then the protective member 60 is pressed to the power button 30, the power button 30 is depressed to turn on/off the system. The power button 30 is then returned to its initial position by a retraction force of the spring member (not shown) which is integrally provided in the power button 30, and the protective member 60 is withdrawn outwardly with the posts 54 disengage from the through holes 24. At this position, the reset button 15 is exposed from the cutout 58 of the protective member 50, if a user want to reset the system, just depress the reset button 15. Then the protective member 60 is rotated to the non-operating position.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A computer bezel comprising:
   a front panel comprising a concave portion, the concave portion defining at least one slot and at least one through hole;
   a button attached to the front panel;
   an annular member attached to the front panel and set around the button; and
   a protective member for covering the button, the protective member comprising at least one hook engaging in said slot for slidably attaching the protective member to the front panel, and two posts formed on the protective member;
   wherein when said post is in alignment with the corresponding through hole, the protective member is depressed to push the button.

2. The computer bezel as claimed in claim 1, wherein the front panel comprises a plurality of locking holes, and the annular member comprises a plurality of catches engaging in the locking holes for attaching the annular member to the front panel.

3. The computer bezel as claimed in claim 1, wherein a reset button is attached to the front panel, the protective member comprises a circular flange and an operation portion, at least one cutout is formed between edges of the operation portion and the circular flange for the reset button being exposed therethrough.

4. A computer bezel comprising:
   a front panel comprising at lest one through bole;
   a button attached to the front panel;
   a protective member attached to the front panel and located above the button, the protective member baying at least one post extending therefrom toward the front panel, wherein the protective member rotates between a non-operation position in which said post is offset and away from the at least one through hole of the front panel to be held by the front panel so that the button can not be depressed, and an operation position in which said post is in alignment with said through hole and is not held by the front panel by means of being able to move into the at least one through hole so that the protective member is depressable to push the button.

5. The computer bezel as claimed in claim 4, wherein the front panel defines at least one slot therein, the protective member has at least one hook engaging in said slot to attach the protective member to the front panel.

6. The computer bezel as claimed in claim 4, wherein an annular member attached to the front panel and set around the button.

7. The computer bezel as claimed in claim 6, wherein a reset button is attached to the front panel and extends through the annular member, the protective member comprises a circular flange and an operation portion, at least one cutout is formed between edges of the operation portion and the circular flange for the reset button being exposed therethrough.

8. A bezel for an electronic device, comprising:
   a receiving portion defined front a user-accessible side of said bezel to provide an access to a component next to said bezel;
   a button received in said receiving portion and movable relative to said bezel between a first position to engage with said component and a second position to disengage from said component; and
   a protective member attached to said bezel and coveting said button along at least one accessible direction to said button, said protective member movable relative to said bezel along a direction different from a moving direction of said button between said first and second positions thereof, and engagable with said button in case of moving of said protective member to a predetermined location so as to allow said button drivable along said at least one accessible direction from said second position thereof to said first position thereof.

9. The bezel as claimed in claim 8, further comprising an annular member attached to said bezel and surrounding said button.

10. The bezel as claimed in claim 8, wherein said protective member rotates about an axis extending along said moving direction of said button.

11. The bezel as claimed in claim 8, wherein a through hole is defined in said bezel to allow a post extending from said protective member to pass through in ease that said protective moves to said predetermined location.

12. The bezel as claimed in claim 8, wherein an operation portion is defined on said protective member so as to provide a larger occupied area than said button beside said bezel so as to perform said covering of said protective member.

* * * * *